(12) United States Patent
Kusukawa et al.

(10) Patent No.: US 8,917,481 B2
(45) Date of Patent: Dec. 23, 2014

(54) HIGH FREQUENCY MAGNETIC FIELD ASSISTED MAGNETIC RECORDING HEAD, AND METHOD OF MANUFACTURING SAME

(71) Applicant: Hitachi, Ltd., Tokyo (JP)

(72) Inventors: Kikuo Kusukawa, Tokyo (JP);
Junichiro Shimizu, Tokyo (JP);
Katsuro Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/255,035

(22) Filed: Apr. 17, 2014

(65) Prior Publication Data
US 2014/0313616 A1  Oct. 23, 2014

(30) Foreign Application Priority Data

Apr. 19, 2013 (JP) .................. 2013-088538

(51) Int. Cl.
*G11B 5/127* (2006.01)
*G11B 5/187* (2006.01)
*G11B 5/31* (2006.01)
*G11B 5/00* (2006.01)

(52) U.S. Cl.
CPC .............. *G11B 5/187* (2013.01); *G11B 5/3103* (2013.01); *G11B 2005/0005* (2013.01)
USPC ..................................... 360/125.3

(58) Field of Classification Search
CPC .................. G11B 5/127; G11B 5/40
USPC ............... 360/125.3, 125.32, 125.03, 125.11, 360/125.15; 29/603.12, 603.13, 603.15, 29/603.16
See application file for complete search history.

(56) References Cited

U.S. PATENT DOCUMENTS 8,837,086 B2 * 9/2014 Udo et al. .................. 360/125.3
2013/0057980 A1 * 3/2013 Shiimoto et al. ............... 360/110

OTHER PUBLICATIONS

Jian-Gang Zhu, et. al., Microwave Assisted Magnetic Recording, IEEE Transaction on Magnetics, 2008, pp. 125-131, vol. 44(1).

* cited by examiner

*Primary Examiner* — Allen T Cao
(74) *Attorney, Agent, or Firm* — Antonelli, Terry, Stout & Kraus, LLP.

(57) ABSTRACT

Provided are a structure of a high frequency magnetic field assisted magnetic recording head in which the positional relationship of a main magnetic pole and a spin torque oscillator in a cross-track direction is accurately determined, and in which variations are not caused in high frequency magnetic field assist characteristics, and a method of manufacturing the structure. The high frequency magnetic field assisted magnetic recording head includes a main magnetic pole, a spin torque oscillator disposed on the main magnetic pole, and an insulating side gap covering a side surface of the main magnetic pole and a side surface of the spin torque oscillator. The main magnetic pole and the spin torque oscillator are formed between both side surfaces of the side gap. Thus, a self-alignment structure of the high frequency magnetic field assisted magnetic recording head is obtained.

8 Claims, 8 Drawing Sheets

HIGH FREQUENCY MAGNETIC FIELD ASSISTED MAGNETIC RECORDING HEAD, AND METHOD OF MANUFACTURING SAME

CLAIM OF PRIORITY

The present application claims priority from Japanese patent application JP 2013-088538 filed on Apr. 19, 2013, the content of which is hereby incorporated by reference into this application.

TECHNICAL FIELD

The present invention relates to a high frequency magnetic field assisted magnetic recording head that assists magnetic recording with a high frequency magnetic field, and a method of manufacturing the same.

BACKGROUND ART

Magnetic disk units mounted on computers and the like as an information recording apparatus are required to have higher recording densities so as to store vast amounts of information without increasing the size of the apparatus. In order to increase the recording density of magnetic disks, a high-coercivity recording medium is used to meet the need for reliably writing minute pieces of recording information in the recording medium. To record the high-coercivity recording medium, it is necessary to focus a strong recording field in a very small region. However, as the recording density is increased, it becomes technically difficult to focus the strong recording field in the very small region.

As a technology to overcome this problem, energy assisted recording technology that assists recording by adding separate energy to the recording field is regarded as a likely candidate. As the energy used for the assisting, heat and high frequency magnetic field are currently considered more practically promising.

The energy assisted recording using heat is referred to as "thermally assisted magnetic recording" or "optically assisted recording". At the time of recording, the recording medium (ferromagnetic material) is irradiated with light simultaneously with magnetic field application, thus heating the medium to temperatures near the Curie temperature of the recording medium (approximately several hundred degrees Celsius) and reducing its coercivity. In this way, recording of a high-coercivity recording medium for which recording has been difficult with the conventional magnetic recording head due to a lack of recording field strength can be facilitated. For reproduction, a magnetoresistive effect element that is used in conventional magnetic recording is used.

In the thermally assisted magnetic recording system, laser light for heating the medium is guided to the recording head. As a laser light source, a small-size and small-power-consumption semiconductor laser diode is used due to the need for use within the magnetic disk apparatus package.

On the other hand, the energy assisted recording that employs a high frequency magnetic field as the energy is referred to as "high frequency magnetic field assisted magnetic recording" or "microwave assisted magnetic recording". The recording medium is irradiated with a high frequency magnetic field separately from the recording field to make the magnetization of the recording medium resonate and easier to move, thus facilitating the recording of the high-coercivity recording medium for which recording has been difficult due to the lack of recording field strength. For reading, a magnetoresistive effect element that is used in conventional magnetic recording is used, as in thermally assisted recording.

In the high frequency magnetic field assisted magnetic recording, an element that generates the high frequency magnetic field is disposed in the vicinity of the recording magnetic pole. This element is referred to as a spin torque oscillator (STO). The STO is disposed between a main magnetic pole and a trailing shield. A high frequency magnetic field assisted magnetic recording head in which the STO is disposed in the vicinity of the recording magnetic pole is disclosed in Non-patent Document 1, for example. The STO has a magnetic-film stacked structure similar to a read sensor for GMR or TMR used in the head of a magnetic disk apparatus, and has the feature that it can be easily integrally formed with a conventional magnetic head.

PRIOR ART DOCUMENT

Non-patent Document 1: J. Zhu, et al., "Microwave assisted magnetic recording", IEEE Transactions on Magnetics, Vol. 44 (2008), pp. 125-131

SUMMARY OF THE INVENTION

Problem to be Solved by the Invention

The high frequency magnetic field generated by the STO unstably moves the magnetization of the high-coercivity recording medium for which recording with the recording field generated by the main magnetic pole alone cannot be performed, thereby making it easier for the magnetization to be reversed, and facilitating magnetic recording. Thus, the magnetic field generated by the main magnetic pole and the high frequency magnetic field generated by the STO need to be superimposed. In order to efficiently obtain the assist effect, it is also desirable to position the STO and the main magnetic pole as close to each other as possible. Accordingly, it is desirable to form the STO as close as possible to the trailing side end where the main magnetic pole generates a strong recording field. Thus, a structure in which the STO is formed in proximity to the main magnetic pole between the main magnetic pole and the trailing shield is the basic structure of the recording head portion of the high frequency magnetic field assisted magnetic recording head.

While the above structure with the main magnetic pole and the STO disposed close to each other may be appropriate in the bit direction (which may also be referred to as "on-track direction"), it is also necessary to accurately position the main magnetic pole and the STO in a perpendicular direction, i.e., a cross-track direction. The bits as the units of recording in the magnetic disk are longer in the cross-track direction. Thus, if the positions of the main magnetic pole and the STO are displaced from their predetermined positions in the cross-track direction, sufficient assisting cannot be performed with the high frequency magnetic field from the STO. Even if the assist effect is obtained, assist effect variations may be caused if the main magnetic pole and the STO are not uniformly positioned from one magnetic head to another but displaced. Thus, a structure such that a uniform positional relationship between the main magnetic pole and the STO in the cross-track direction can be maintained and characteristics variations due to a position error are not caused is required.

According to a conventional recording system, while it is desired to have the center of the main magnetic pole and the center of the STO aligned with each other, it is difficult to achieve their complete alignment because the main magnetic pole and the STO are formed by separate lithography and etching processes, where the positioning accuracy is determined by the accuracy of lithography. The positional misalignment decreases the high frequency magnetic field assist effect, and the positional variations are a main cause of variations in the assist characteristics by the STO. Thus, it is important to obtain a uniform positional relationship between the main magnetic pole and the STO.

As a method for preventing the position error between the main magnetic pole and the STO, the main magnetic pole and the STO may be etched in one batch. However, in the method by which the main magnetic pole and the STO are etched in one batch, it is difficult to set the inclined angle of the side surface of the main magnetic pole and the inclined angle of the side surface of the STO individually, or to form separate shapes in the depth direction from the air bearing surface. Thus, it is difficult to create shapes that optimize the characteristics of the main magnetic pole and the STO. As a result, it has been difficult to manufacture a high frequency magnetic field assisted magnetic recording head that can provide high performance.

The present invention provides a structure such that, in a high frequency magnetic field assisted magnetic recording head, the positional relationship between the main magnetic pole and the STO in the cross-track direction can be accurately determined, and variations in high frequency magnetic field assist characteristics are not caused. The invention also provides a method of manufacturing the same.

Means for Solving the Problem

A high frequency magnetic field assisted magnetic recording head according to the present invention includes a main magnetic pole that generates a recording field; a spin torque oscillator disposed on a trailing side of the main magnetic pole; a trailing shield disposed on a surface of the spin torque oscillator on a side opposite to a surface on a main magnetic pole side; a non-magnetic and electrically insulating side gap covering a side surface of the main magnetic pole and a side surface of the spin torque oscillator at least on an air bearing surface; and a side shield disposed laterally of the main magnetic pole across the side gap. Thus, the high frequency magnetic field assisted magnetic recording head of a self-alignment structure in which the positions of the centers of the main magnetic pole and the spin torque oscillator are aligned is provided. At least on the air bearing surface, A>B, where A is an angle formed by the side surface of the spin torque oscillator, and B is an angle formed by the side surface of the main magnetic pole, with respect to a plane perpendicular to a film stacked direction.

The trailing shield and the side shield may have a wrap-around shield structure in which the trailing shield and the side shield are in contact with each other. Alternatively, the trailing shield and the side shield may have a structure such that a non-magnetic insulating film for controlling the angle A of the spin torque oscillator is disposed laterally of the spin torque oscillator and between the trailing shield and the side shield.

A method of manufacturing a high frequency magnetic field assisted magnetic recording head according to the present invention includes the steps of forming a side gap on both sides of a main magnetic pole and forming a side shield with a chemical mechanical polishing (CMP) stopper layer (STO inclination control layer) on an outer side of the side gap; forming a step such that the side gap protrudes on a trailing side surface at a boundary with the main magnetic pole by performing an etch-back under different etching rate conditions between the side gap and an STO inclination control layer and the main magnetic pole; forming a stacked film constituting a spin torque oscillator on the main magnetic pole and the side gap between which the step is formed; and removing a portion of the stacked film for the spin torque oscillator other than a portion of the stacked film embedded in the step between both sides of the side gap. Thus, the high frequency magnetic field assisted magnetic recording head of a self-alignment structure such that the positions of the main magnetic pole and the spin torque oscillator are aligned is provided.

The forming of the main magnetic pole and the side gap includes the steps of forming a trench portion in the stacked film including a side shield magnetic film and an STO inclination control layer formed on the side shield magnetic film; covering the trench portion with a side gap material; and filling the trench portion of the side gap material with a main magnetic pole material. In the step of forming the trench portion in the stacked film, an etching condition is varied during the step such that $\alpha > \beta$, where $\alpha$ is an angle formed by an end surface of the STO inclination control layer forming a side surface of the trench portion, and $\beta$ is an angle formed by an end surface of the side shield magnetic film, with respect to a plane perpendicular to a film stacked direction.

Effects of the Invention

According to the present invention, the positional relationship of the main magnetic pole and the STO in the cross-track direction can be accurately determined, whereby a structure such that a stable high frequency magnetic field can be applied to the recording field in a superimposed manner can be provided. By providing the STO inclination control layer on the side shield during manufacturing, the inclination of the side surface of the STO can be made greater than the inclination of the side surface of the main magnetic pole. This is effective in increasing the density of current that flows in the STO and the high frequency magnetic field that is generated. As a result, a magnetic recording head in which a stable high frequency magnetic field assist effect can be obtained can be provided, and the recording density can be increased.

Other problems, configurations, and effects will become apparent from the following description of embodiments.

MODE FOR CARRYING OUT THE INVENTION

Figure 1:
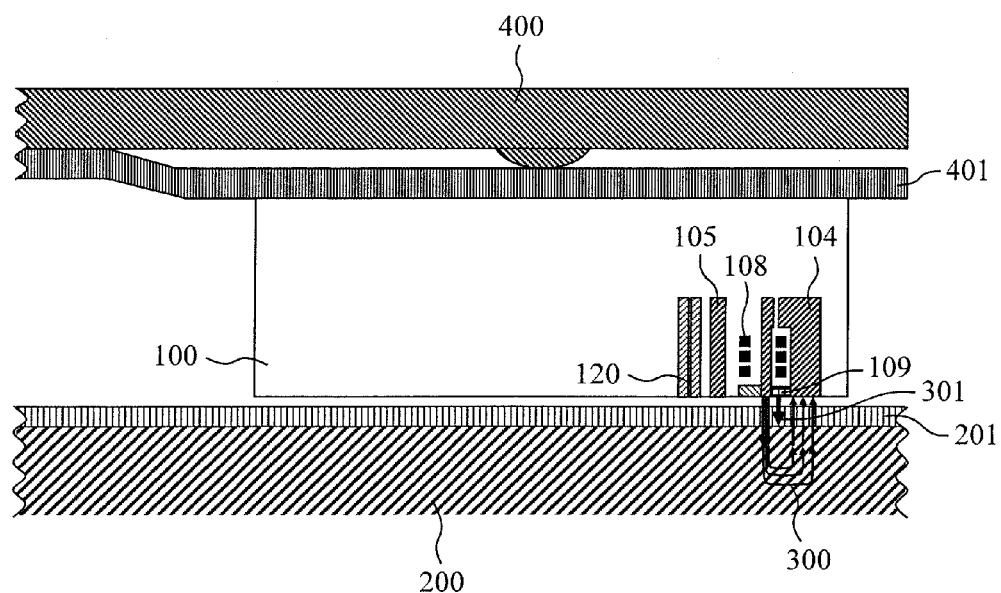
FIG. 1 is a schematic cross sectional view illustrating an embodiment of a slider provided with a high frequency magnetic field assisted magnetic recording head.

In a wafer process in which a spin torque oscillator (STO) is formed at the trailing side end of a main magnetic pole, the main magnetic pole is formed and then the STO is formed on the main magnetic pole. Because the main magnetic pole and the STO are formed by separate lithography steps, position variations due to the accuracy of the respective lithography steps are caused in the cross-track direction according to the conventional manufacturing method. In order to align the positions of the main magnetic pole and the STO in the cross-track direction, the following method is adopted by the present invention.

On the side shield material, an STO inclination control layer is formed in advance. The STO inclination control layer is a non-magnetic insulating film, and is composed of a material with higher etching resistance than the material of the main magnetic pole. For the main magnetic pole, normally a material with high saturation magnetic flux density, such as an alloy of iron and cobalt, is formed into an inverted trapezoidal or inverted-triangular shape in the air bearing surface. The main magnetic pole is surrounded by a non-magnetic material as a side gap material.

When the STO is formed, the trailing side surface of the main magnetic pole is planarized. At this time, the surface of the side gap material positioned on the side surface of the main magnetic pole and the surface of the STO inclination control layer on the side shield disposed on the side surface of the side gap material are also simultaneously planarized. Because the main magnetic pole, the side gap material, and the STO inclination control layer have different materials, a step can be intentionally produced at the boundary between the main magnetic pole and the side gap material by selectively etching the main magnetic pole based on a difference in etching rate during the planarization process by ion milling. When a multilayer film for the STO is formed on the main magnetic pole with the step, on the side gap, and on the STO inclination control layer, and a planarization process by CMP is performed, the multilayer film for the STO formed on the step is shaved off, leaving only the region sandwiched by the side gap. Thus, the STO in contact with the trailing side surface of the main magnetic pole has a self-alignment structure in which the position of the STO is aligned with the main magnetic pole in the cross-track direction.

The inclination angle of the STO side surface follows the inclination angle of the surface of the side gap on which the STO inclination control layer is processed. Thus, inclination angle of the STO side surface can be made greater than the inclination angle of the side surface of the main magnetic pole and brought close to 90°. In this way, the density of current that flows in the STO can be increased, whereby the intensity of the high frequency magnetic field oscillated by the STO and the assisting effect can be increased. When the STO inclination control layer is not formed on the side gap, the inclination of the STO side surface cannot be controlled independently from the inclination of the main magnetic pole side surface, even if the main magnetic pole and the STO have the self-alignment structure. As a result, the STO and the side surface of the main magnetic pole will have the same inclination angle. Thus, the density of the current that flows in the STO cannot be increased so much as according to the present invention, resulting an inferior assisting effect compared with the structure of the present invention.

By the method of manufacturing as described above, the positional relationship between the main magnetic pole and the STO can be accurately controlled, whereby a high frequency magnetic field assisted magnetic recording head that enables a stable operation of the assist mechanism can be provided.

Figure 2:
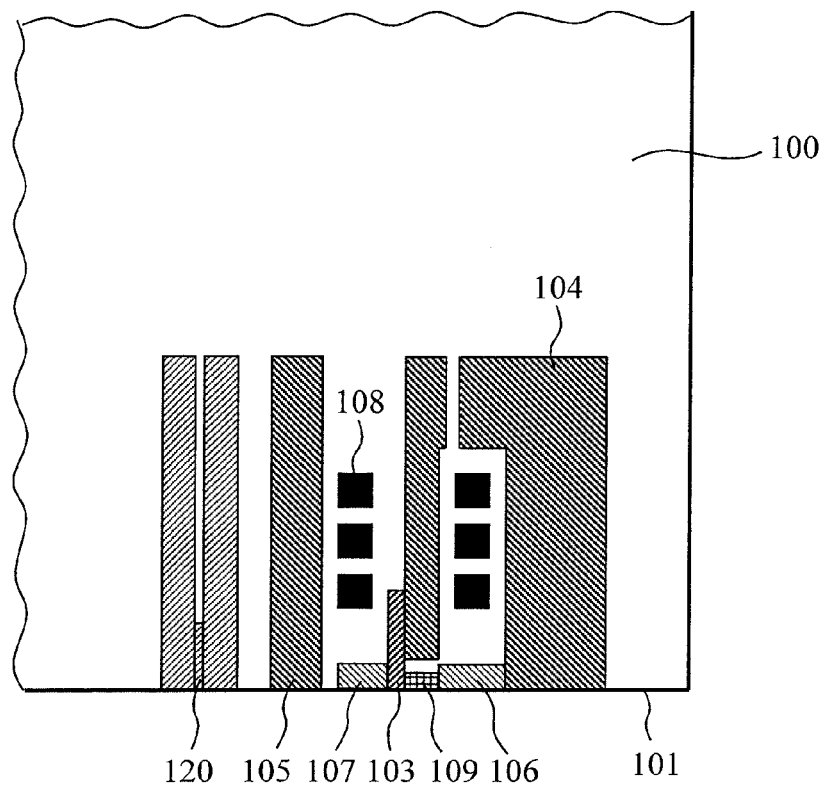
FIG. 2 is an enlarged schematic cross sectional view in the vicinity of magnetic poles.

In the following, embodiments of the present invention will be described with reference to the drawings. FIG. 1 is a schematic cross sectional view illustrating an embodiment of a slider with a high frequency magnetic field assisted magnetic recording head according to the present invention. FIG. 2 is an enlarged schematic cross sectional view in the vicinity of magnetic poles of FIG. 1. As the internal structure of the actual slider is very complex, the drawings are simplified.

In the slider 100, the recording head is provided with a single-pole head including a main magnetic pole 103 and auxiliary magnetic poles 104 and 105; a magnetization coil 108 for magnetizing the single-pole head to cause the main magnetic pole 103 to generate a recording field 300; a trailing shield 106 and a leading-edge shield 107 for cutting the magnetic field from the main magnetic pole down to an appropriate size; and an STO 109 disposed in the vicinity of the main magnetic pole 103. The main magnetic pole 103, the auxiliary magnetic pole 104, and the trailing shield 106 also function as wires for supplying electric power to the STO 109.

The reproducing head is also provided with a magnetoresistive effect element 120 sandwiched between a pair of magnetic shields. The slider 100 is supported by a suspension 400 and a gimbal 401 and flies over the surface of the magnetic recording medium while maintaining a certain floating amount. While the illustrated magnetic recording medium has a structure such that a recording layer 201 is formed on a substrate 200, the magnetic recording medium may also be provided with an underlayer, an orientation control layer, a soft magnetic underlayer, and the like.

The STO 109 is an element that generates a high frequency magnetic field based on a precession of magnetization caused by spin torque, and has a multilayer film structure stacking a high frequency magnetic field generation layer generating the high frequency magnetic field and other layers. The multilayer film has a structure combining magnetic metals and non-magnetic metals. The STO 109 normally has a cuboidal shape with cross-sectional dimensions on the same order as the cross section of the main magnetic pole 103 on an air bearing surface (ABS) 101. As a DC current is supplied to the STO 109 from the main magnetic pole 103 toward the trailing shield 106 in the stacked direction of the STO 109, precession is caused in the magnetization of the high frequency magnetic field generation layer, whereby the high frequency magnetic field is generated. The magnetic field 300 generated by the main magnetic pole 103 and a high frequency magnetic field 301 generated by the STO 109 are applied to the recording layer 201 of the magnetic recording medium.

Figure 3:
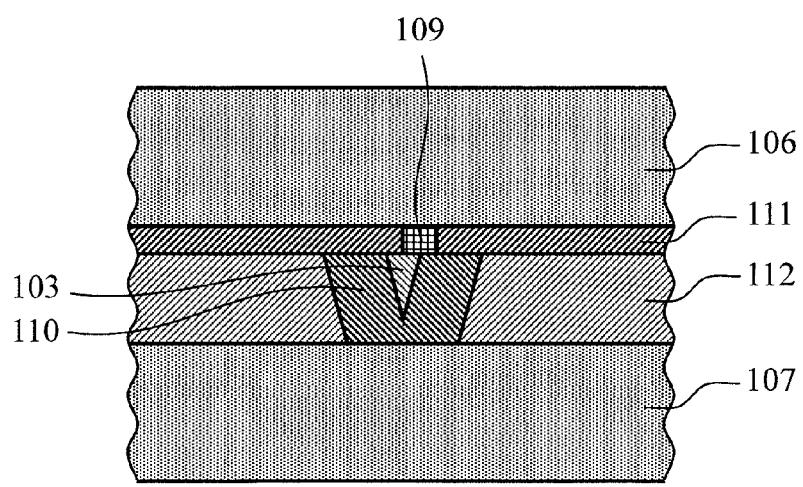
FIG. 3 is an enlarged schematic cross sectional view in the vicinity of the magnetic poles in an ABS of the high frequency magnetic field assisted magnetic recording head.

FIG. 3 illustrates a problem of the high frequency magnetic field assisted magnetic recording head provided with the STO, showing an enlarged schematic cross sectional view on the air bearing surface (ABS). Upper surfaces (trailing side surfaces) of the inverted triangular shaped main magnetic pole 103 and side gap 110, and of the side shield 112 form a flat and flush plane, on which the STO 109 is formed. To the sides of the STO 109, a trailing gap 111 of a non-magnetic insulating layer is disposed. The main magnetic pole 103 and the side shield 112 are magnetic materials, while the side gap 110 is a non-magnetic material. Normally, the main magnetic pole 103 and the STO 109 are formed through separate lithography steps. Thus, no matter how accurate the lithography technology used may be, it is difficult to position the main magnetic pole 103 and the STO 109 uniformly in the cross-track direction and with high reproducibility.

Figure 4:
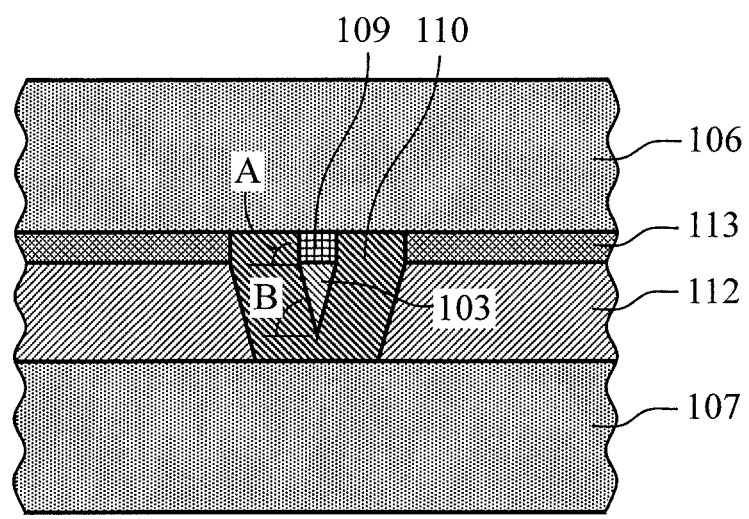
FIG. 4 is an enlarged schematic cross sectional view in the vicinity of the magnetic poles in the ABS of the high frequency magnetic field assisted magnetic recording head.

FIG. 4 is an enlarged schematic cross sectional view of a high frequency magnetic field assisted magnetic recording head according to an embodiment of the present invention on the air bearing surface (ABS). Upper surfaces (trailing side surfaces) of the main magnetic pole 103 and the side gap 110 are not flat in the same upper plane. Between the trailing side surface of the main magnetic pole 103 and the trailing side surface of the side gap 110, a step is formed, with the trailing side surface of the main magnetic pole 103 recessed with respect to the trailing side surface of the side gap 110. The STO 109 is formed in the step in a buried manner. The trailing side surface of the STO 109 and the trailing side surface of the side gap 110 are flat in the same plane. An inclination angle A of an STO side surface with respect to a plane perpendicular to a film stacked direction is greater than an inclination angle B of a main magnetic pole side surface with respect to the plane perpendicular to the film stacked direction. The film stacked direction refers to the direction in which, when the structure of FIG. 4 is formed, the material films for the leading shield 107, the side shield 112, the side gap 110, the main magnetic pole 103, the STO 109, the STO inclination control layer 113, and the trailing shield 106 and the like are stacked, the direction corresponding to the upper/lower direction in the sheet of FIG. 4. The inclination angle A of the STO side surface is typically 90°. The inclination angle B of the main magnetic pole side surface is 75°, for example.

Such shapes can be easily formed by providing the STO inclination control layer 113 for controlling the inclination angle A on the side shield 112 during the processing for fabricating the trenches for forming the main magnetic pole 103 or the side gap 110. In the structure of FIG. 4, the STO inclination control layer 113 remains to the side of the STO 109, sandwiched by the trailing shield 106 and the side shield 112.

Figure 5:
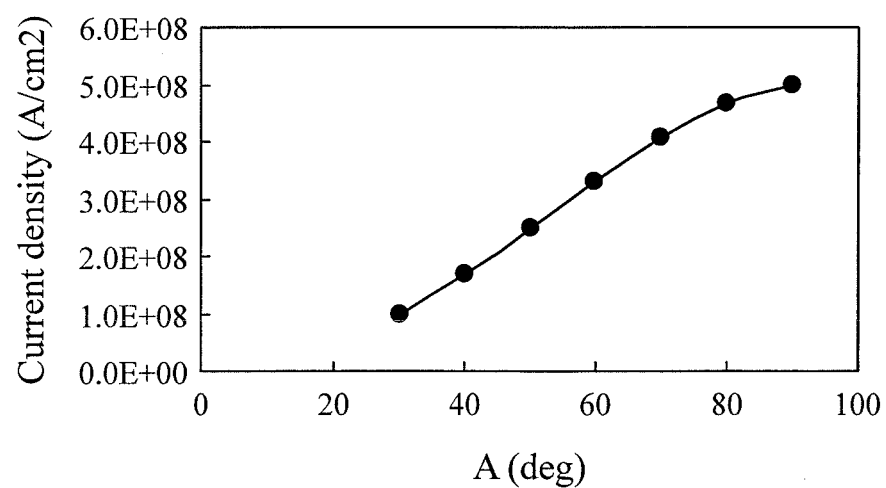
FIG. 5 is a chart illustrating a relationship between an inclination angle of a side wall of the STO and the density of current that flows in the STO.

FIG. 5 illustrates a relationship between the inclination angle A of the STO side surface and current density in the high frequency magnetic field assisted magnetic recording head. The main magnetic pole 103 has an inverted-triangular shape, with a track width of 50 nm and a constant inclination angle B of 75°. The STO has the same width on the surface contacting the main magnetic pole, while the length of the surface of the STO contacting the trailing shield 106 is varied by the inclination angle A. The main magnetic pole 103 and the trailing shield 106 were given a potential difference of 100 mV, and the inclination angle A of the STO side surface was varied between 30° and 90° when the density of current flow in the STO was calculated. The vertical axis of the figure shows the density of current that flows in the STO 109. As the inclination angle A is increased, the current density increases and so does the oscillation intensity of the high frequency magnetic field, whereby the assisting effect is increased. In the absence of the STO inclination control layer 113, the inclination angle A of the side surface of the STO 109 agrees with the inclination angle B of the side surface of the main magnetic pole. On the other hand, in the structure in which the STO inclination control layer 113 is disposed on the side shield 112, the trench is formed by etching with different conditions, whereby the inclination angle of the side surface can have two stages. Thus, the inclination angle A of the side surface of the STO 109 can be made greater than the inclination angle B of the side surface of the main magnetic pole 103. Thus, the current density of the STO can be further increased compared with the structure in which the inclination angle A is equal to the inclination angle B. Accordingly, the assisting effect of the STO 109 can be further increased.

Figure 6:
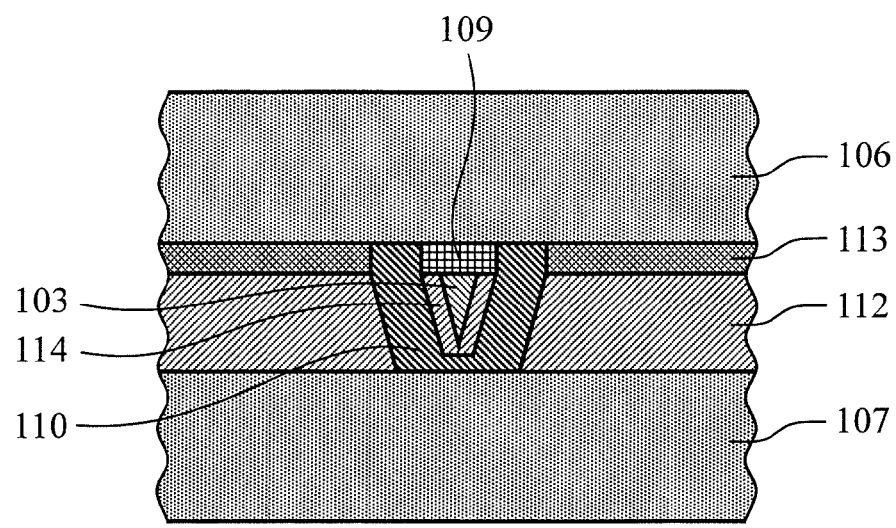
FIG. 6 is an enlarged schematic cross sectional view around the magnetic poles in the ABS of a high frequency magnetic field assisted magnetic recording head.
Figure 7:
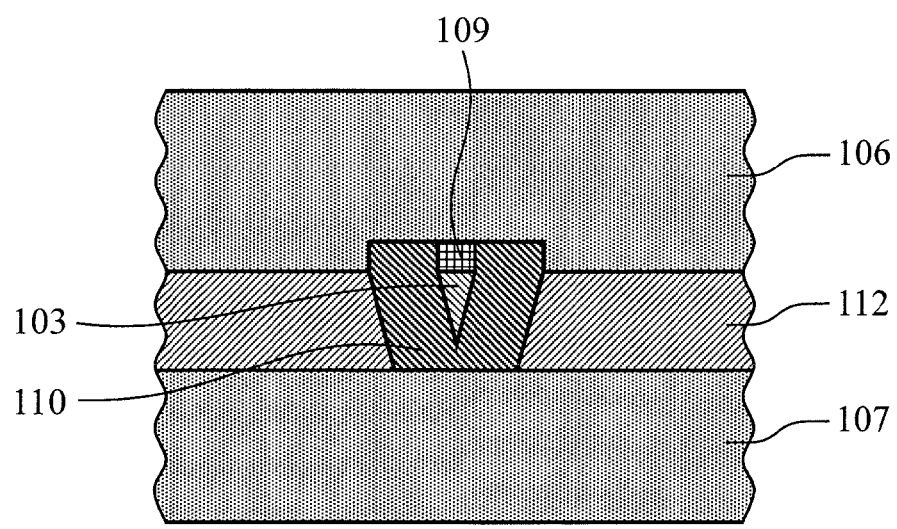
FIG. 7 is an enlarged schematic cross sectional view in the vicinity of the magnetic poles in the ABS of the high frequency magnetic field assisted magnetic recording head.
Figure 8:
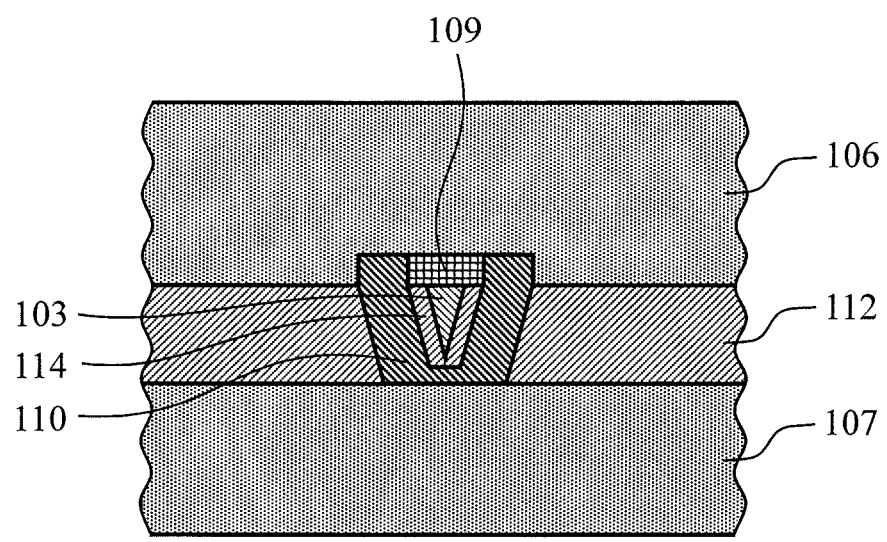
FIG. 8 is an enlarged schematic cross sectional view in the vicinity of the magnetic poles in the ABS of the high frequency magnetic field assisted magnetic recording head.

In the structure illustrated in FIG. 4, the width of the main magnetic pole 103 and the width of the STO 109 are the same. However, as illustrated in FIG. 6, a non-magnetic conducting layer 114 may be formed around the main magnetic pole 103, whereby a structure in which the width of the STO 109 is greater than the width of the main magnetic pole 103 can be obtained. Examples of the material of the non-magnetic conducting layer 114 include ruthenium (Ru) and nichrome (NiCr). In FIGS. 4 and 6, the dimensions of the main magnetic pole 103 are the same. In the structure of FIG. 6, the high frequency magnetic field from the STO 109 can be caused to act on the recording field generated by the main magnetic pole 103 in a wider area. Further, the main magnetic pole 103 and the non-magnetic conducting layer 114 act as one large electrode, so that the density of current that flows in the STO 109 can be increased, and the assisting effect can be further increased In FIG. 4 or 6, the STO inclination control layer 113 may be removed immediately before forming the trailing shield 106 so as to cause the trailing shield 106 and the side shield 112 to contact each other and be integrated, as illustrated in FIG. 7 or 8. The structure is referred to as a "wrap-around shield structure", in which a magnetic gap between the trailing shield 106 and the side shield 112 is removed. When there is the magnetic gap between the trailing shield 106 and the side shield 112, the recording field may be expanded during recording, resulting in an increase in the recording track width. This makes it difficult to achieve a high recording density. In the wrap-around shield structure, the recording track width can be restricted. It is noted, however, that in this structure, the side gap 110 formed between the main magnetic pole 103 and the side shield 112 needs to be an insulating film in order to allow current to flow in the STO 109.

FIGS. 9 to 15 are a process chart for schematically describing the process of forming the structure illustrated in FIG. 4 in sequence, showing enlarged cross-sectional views of the air bearing surface (ABS). In the following, for the sake of simplifying description, the material of which a film is formed for providing a final functional member will be designated with the same numeral as the numeral of the corresponding functional member. For example, in FIG. 11, the material of which a film is formed for providing the side gap 110 will be designated a side gap material 110.

Figure 9:
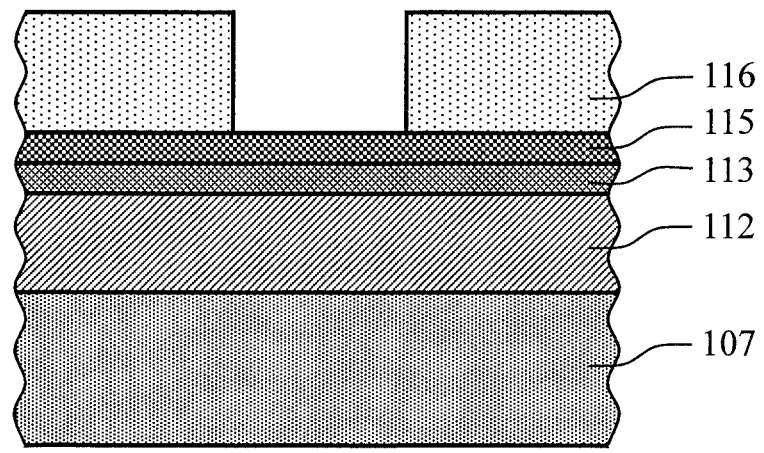
FIG. 9 is a schematic cross sectional view illustrating a step of forming the high frequency magnetic field assisted magnetic recording head.

FIG. 9 illustrates a state prior to processing a trench for forming the main magnetic pole. On the leading shield 107, films of a side shield material 112, the STO inclination control layer 113, and a hard mask material 115 are successively formed, with a resist pattern 116 further formed thereon. The material of the side shield 112 is a magnetic material such as NiFe. The STO inclination control layer 113 is made of a non-magnetic and electrically insulating material with high CMP/milling resistance, such as diamond like carbon (DLC). The hard mask 115 is made of a material with resistance to the processing of the STO inclination control layer 113 and the side shield 112, such as NiCr.

Figure 10:
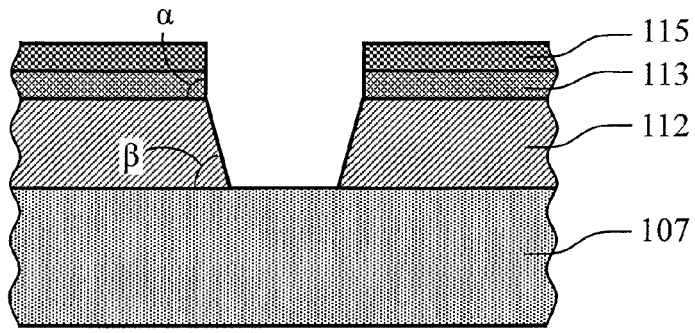
FIG. 10 is a schematic cross sectional view illustrating a step of manufacturing the high frequency magnetic field assisted magnetic recording head.

FIG. 10 illustrates a state in which the trench for forming the main magnetic pole has been fabricated by using the resist pattern 116 as a mask. First, the hard mask 115 is processed by Ar ion etching using the resist pattern 116 as a mask. Then, the STO inclination control layer 113 is etched by reactive ion etching, using the hard mask 115 as a mask. Further, the side shield 112 is etched in a different etching atmosphere. At this time, an inclination angle α of an end surface exposed by the etching of the STO inclination control layer 113 corresponds to the inclination angle A of the side surface of the STO to be later formed. An inclination angle β of an end surface exposed by the etching of the side shield 112 corresponds to the inclination angle B of the side surface of the main magnetic pole to be later formed. Thus, by making the inclination angle α of the exposed end surface of the STO inclination control layer 113 greater than the inclination angle β of the exposed end surface of the side shield 112, the relation A>B shown in FIG. 4 can be obtained. In this way, the density of current that flows in the STO of the high frequency magnetic field assisted magnetic recording head manufactured as illustrated in FIG. 5 can be increased, whereby the high frequency magnetic field becomes stronger, and the assisting effect can be increased. The inclination angle of the side surface of the hard mask 115 or the STO inclination control layer 113 can be controlled depending on etching conditions.

Figure 11:
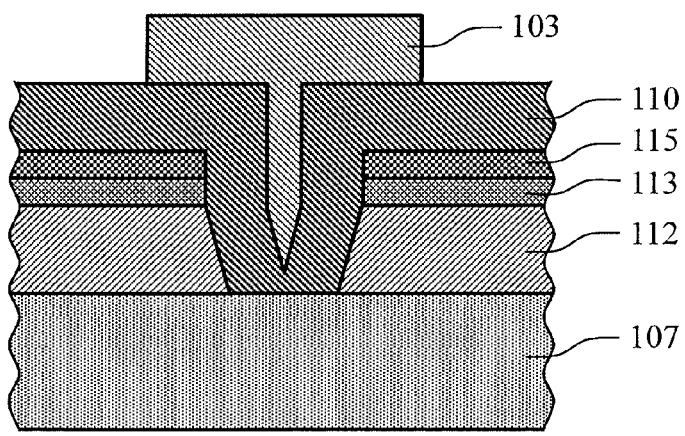
FIG. 11 is a schematic cross sectional view illustrating a step of manufacturing the high frequency magnetic field assisted magnetic recording head.

FIG. 11 illustrates a state in which the side gap material 110 and the main magnetic pole material 103 have been formed in the trench. Initially, the trench portion is covered with the side gap material 110, and then the trench portion of the side gap material 110 is filled with the main magnetic pole material 103. The main magnetic pole 103 may be made of a ferromagnetic material such as a FeCo alloy, while the side gap 110 may be made of a non-magnetic material such as $Al_2O_3$ or Ru. The side gap 110 may be formed by atomic layer deposition (ALD), whereby a good film can also be formed on the trench portion. The main magnetic pole 103 may be formed by a frame plating process using a resist.

Figure 12:
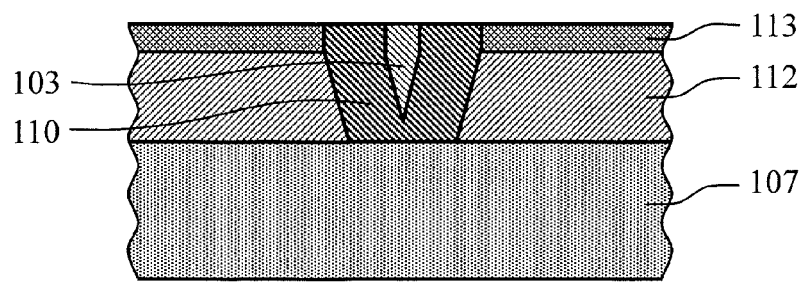
FIG. 12 is a schematic cross sectional view illustrating a step of manufacturing the high frequency magnetic field assisted magnetic recording head.

FIG. 12 illustrates a state in which the surfaces of the STO inclination control layer 113, the side gap 110, and the main magnetic pole 103 have been planarized by CMP. By CMP, the main magnetic pole material 103 and the side gap material 110 are polished, with the STO inclination control layer 113 providing a CMP stopper layer. Thus, the surface of the STO inclination control layer 113 is exposed, and the polishing is stopped when the surface is flat.

Figure 13:
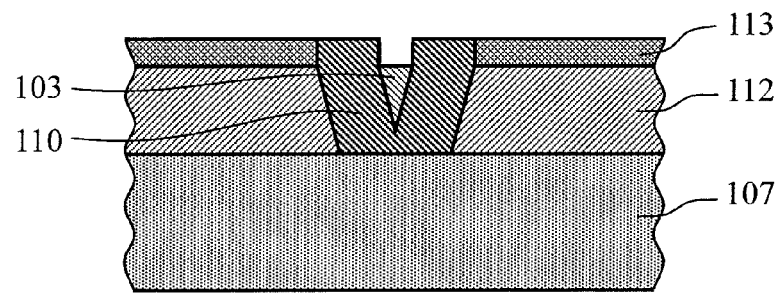
FIG. 13 is a schematic cross sectional view illustrating a step of manufacturing the high frequency magnetic field assisted magnetic recording head.

FIG. 13 illustrates a state in which the step is formed such that the surface of the main magnetic pole 103 is recessed relative to the surrounding side gap 110 by etching the exposed surface of the main magnetic pole 103 by milling or with the use of an etching solution. For example, the side gap 110 is made of $Al_2O_3$, the STO inclination control layer 113 is made of DLC, and the main magnetic pole 103 is made of a FeCo alloy. The exposed surface of the main magnetic pole 103 may be selectively etched by milling and the like. The depth of etching is matched with the film thickness of the STO film formed in the next step by controlling the milling time, for example. The depth of etching may be somewhat greater than the film thickness of the STO film.

Figure 14:
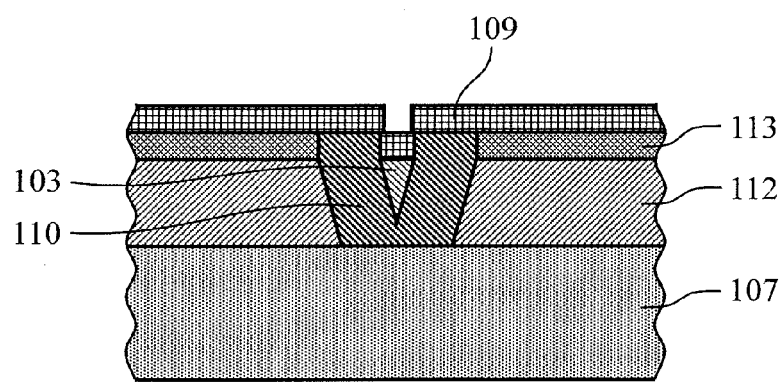
FIG. 14 is a schematic cross sectional view illustrating a step of manufacturing the high frequency magnetic field assisted magnetic recording head.

FIG. 14 illustrates a state in which a film of a STO material 109 has been formed on the main magnetic pole 103 with the step recessed with respect to the surface of the side gap 110 is formed. The STO 109 has a known structure composed of stacked films including a high frequency magnetic field generation layer, an intermediate layer, and a spin injection pinned layer. When the side gap 110 is an insulating film, the STO material 109 may be formed on the main magnetic pole 103 by a plating process using the main magnetic pole 103 as a seed, or by a sputtering process with high directionality. Because the size of the step between the side gap 110 and the main magnetic pole 103 is the same as, or only slightly larger than, the film thickness of the STO 109, the STO material 109 is formed so as to fit into the recess formed on top of the main magnetic pole 103.

Figure 15:
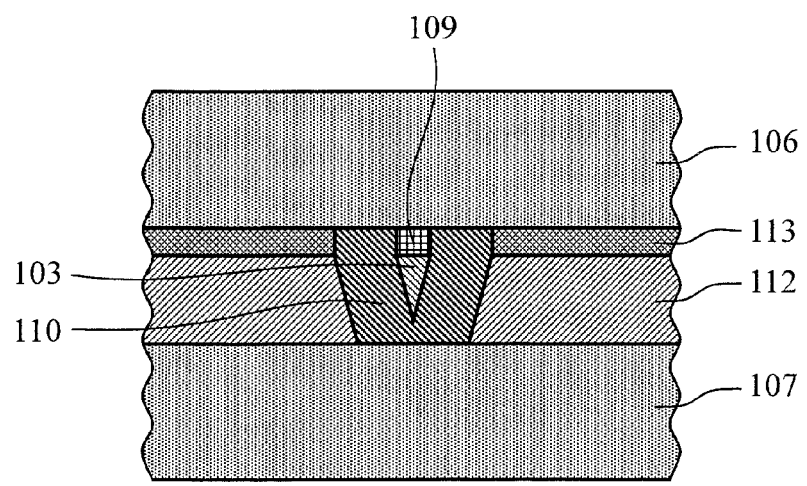
FIG. 15 is a schematic cross sectional view illustrating a step of manufacturing the high frequency magnetic field assisted magnetic recording head.

FIG. 15 illustrates a state in which the STO film on the side gap 110 and the STO inclination control layer 113 has been removed by planarizing the surface by CMP from the state of FIG. 14, and then the trailing shield 106 has been formed. The STO film formed in areas other than over the main magnetic pole 103 is polished by CMP. The polishing is continued until the STO inclination control layer 113 is exposed and the surface is flat. Thereafter, the trailing shield 106 is formed on the planarized surface. By such a forming method, the high frequency magnetic field assisted magnetic recording head according to the present invention can be manufactured.

Figure 16:
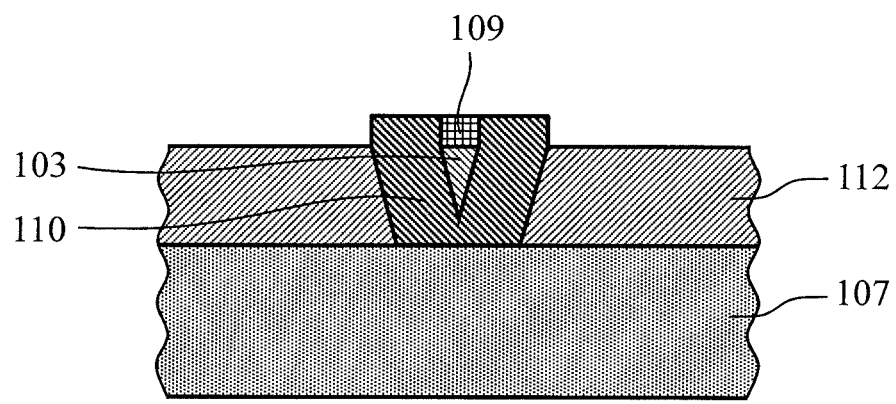
FIG. 16 is a schematic cross sectional view illustrating a step of manufacturing the high frequency magnetic field assisted magnetic recording head.

In FIG. 15, the STO inclination control layer 113 may be removed prior to the formation of the trailing shield 106, as illustrated in FIG. 16. When the STO inclination control layer 113 is made of DLC, for example, the removal of the STO inclination control layer 113 may be performed by etching using an oxygen-based gas, such as in an $O_2$ asher. When the trailing shield 106 is formed in the state of FIG. 16, the wrap-around shield structure illustrated in FIG. 7 can be obtained.

It is also possible to manufacture the high frequency magnetic field assisted magnetic recording head of the structure illustrated in FIG. 6 by providing the side gap illustrated in FIG. 11 with a two-layer non-magnetic layer configuration including the side gap 110 of insulating film material and a second side gap of the non-magnetic conducting layer 114. Namely, in order to obtain the structure of FIG. 6, after the side gap material layer covering the trench portion of the side shield 112 is formed, the non-magnetic conducting layer 114 is formed in the trench portion of the side gap material layer. Then, the trench portion of the side gap material layer covered with the non-magnetic conducting layer 114 may be filled with the main magnetic pole material.

The side gap 110 illustrated in FIG. 4 may include a stacked film of two or more layers, such as a stacked film of an oxide film and a nitride film.

The present invention is not limited to the foregoing embodiments and may include various modifications. For example, the foregoing embodiments have been set forth to aid the description of the present invention in an easily understandable manner, and the present invention is not necessarily limited to have all of the described configurations. A part of the configuration of a certain embodiment may be substituted with the configuration of another embodiment, or the configuration of the other embodiment may be added to the configuration of the certain embodiment. A part of the configuration of each embodiment may be modified by addition, deletion, or substitution with another configuration. For example, an electric wire may be used instead of the trailing shield.

Reference Signs List
100 Slider
101 Air bearing surface (ABS)
103 Main magnetic pole
104 Auxiliary magnetic pole
105 Auxiliary magnetic pole
106 Trailing shield
107 Leading-edge shield
108 Magnetization coil
109 STO
110 Side gap
111 Trailing gap
112 Side shield
113 STO inclination control layer
114 Non-magnetic conducting layer
115 Hard mask material
116 Resist pattern
120 Magnetoresistive effect element
200 Magnetic recording medium substrate
201 Recording layer
300 Recording field
301 High frequency magnetic field
400 Suspension
401 Gimbal

What is claimed is:

1. A high frequency magnetic field assisted magnetic recording head comprising:
   a main magnetic pole that generates a recording field;
   a spin torque oscillator disposed on a trailing side of the main magnetic pole;
   a trailing shield disposed on a surface of the spin torque oscillator on a side opposite to a surface on a main magnetic pole side;
   a non-magnetic and electrically insulating side gap covering a side surface of the main magnetic pole and a surface of the spin torque oscillator; and
   a side shield disposed laterally of the main magnetic pole across the side gap,
   wherein A>B, where A is an angle formed by the side surface of the spin torque oscillator, and B is an angle formed by the side surface of the main magnetic pole, with respect to a plane perpendicular to a film stacked direction.

2. The high frequency magnetic field assisted magnetic recording head according to claim 1, comprising a non-magnetic conducting layer between the side gap and the main magnetic pole.

3. The high frequency magnetic field assisted magnetic recording head according to claim 1, wherein the trailing shield and the side shield are in contact with each other.

4. The high frequency magnetic field assisted magnetic recording head according to claim 1, comprising a non-magnetic insulating film disposed laterally of the spin torque oscillator and between the trailing shield and the side shield for controlling the angle A.

5. A method of manufacturing a high frequency magnetic field assisted magnetic recording head, the method comprising the steps of:
   forming a trench portion in a stacked film including a side shield magnetic film and an spin torque oscillator (STO) inclination control layer formed on the side shield magnetic film;
   covering the trench portion with a side gap material;
   filling the trench portion of the side gap material with a main magnetic pole material;
   forming a side gap and a main magnetic pole by polishing until the STO inclination control layer is exposed;
   forming a step recessed with respect to the side gap by etching the main magnetic pole exposed by the polishing;
   forming a stacked film for a spin torque oscillator so as to cover the step;
   removing the stacked film for the spin torque oscillator other than a portion of the stacked film embedded in the step; and
   forming a magnetic film for a trailing shield.

6. The method of manufacturing a high frequency magnetic field assisted magnetic recording head according to claim 5, wherein the step of forming the trench portion includes varying an etching condition during the step such that $\alpha>\beta$, where $\alpha$ is an angle formed by an end surface of the STO inclination control layer that constitutes a side surface of the trench portion, and $\beta$ is an angle formed by an end surface of the side shield magnetic film, with respect to a plane perpendicular to a film stacked direction.

7. The method of manufacturing a high frequency magnetic field assisted magnetic recording head according to claim 5, further comprising:
   after a side gap material layer covering the trench portion is formed, forming a non-magnetic conducting layer in a trench portion of the side gap material layer; and
   filling the trench portion of the side gap material layer covered with the non-magnetic conducting layer with the main magnetic pole material.

8. The method of manufacturing a high frequency magnetic field assisted magnetic recording head according to claim 5, further comprising removing the STO inclination control layer prior to the step of forming the magnetic film for the trailing shield.

* * * * *